United States Patent
Xie et al.

(10) Patent No.: US 10,234,860 B2
(45) Date of Patent: Mar. 19, 2019

(54) METHOD AND DEVICE FOR SAFETY DRIVING

(71) Applicant: Beijing Xiaomi Mobile Software Co., Ltd., Beijing (CN)

(72) Inventors: Yan Xie, Beijing (CN); Tian Ren, Beijing (CN); Yue Cheng, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/429,288

(22) Filed: Feb. 10, 2017

(65) Prior Publication Data

US 2017/0371335 A1 Dec. 28, 2017

(30) Foreign Application Priority Data

Jun. 23, 2016 (CN) .......................... 2016 1 0465407

(51) Int. Cl.
| | | |
|---|---|---|
| *G05D 1/00* | (2006.01) | |
| *B62K 11/00* | (2006.01) | |
| *B60L 3/08* | (2006.01) | |
| *B60W 40/09* | (2012.01) | |
| *G07C 5/08* | (2006.01) | |

(52) U.S. Cl.
CPC .............. *G05D 1/0066* (2013.01); *B60L 3/08* (2013.01); *B60W 40/09* (2013.01); *B62K 11/007* (2016.11); *B60W 2530/145* (2013.01); *B60W 2530/18* (2013.01); *B62K 2207/00* (2013.01); *G07C 5/08* (2013.01)

(58) Field of Classification Search
None
See application file for complete search history.

(56) References Cited

U.S. PATENT DOCUMENTS

2013/0238231 A1  9/2013  Chen
2014/0326525 A1* 11/2014  Doerksen ............... A63C 17/12
                                                            180/181
(Continued)

FOREIGN PATENT DOCUMENTS

CN        104063604 A      9/2014
CN        104229005 A     12/2014
(Continued)

OTHER PUBLICATIONS

International Search Report issued by the State Intellectual Property Office of the People's Republic of China dated Jan. 26, 2017 in International Application No. PCT/CN2016/098194.
(Continued)

*Primary Examiner* — Lail A Kleinman
(74) *Attorney, Agent, or Firm* — Finnegan, Henderson, Farabow, Garrett & Dunner LLP

(57) ABSTRACT

The present disclosure relates to a method and a device for safety driving. The method includes: acquiring riding data of a current user of a self-balancing vehicle; comparing the acquired riding data with riding data corresponding to a plurality of preset user levels; and determining a user level of the current user of the self-balancing vehicle according to a result of the comparing. The riding data includes one or more of the following data: a riding time, a riding distance, a shaking frequency, a shaking arc magnitude, and a shaking time.

17 Claims, 11 Drawing Sheets

(56) References Cited

U.S. PATENT DOCUMENTS

2016/0136508 A1 5/2016 Bigler
2017/0240181 A1* 8/2017 Yu .......................... B60W 40/08

FOREIGN PATENT DOCUMENTS

| CN | 104503671 A | 4/2015 |
|---|---|---|
| CN | 104986281 A | 10/2015 |
| CN | 105116817 A | 12/2015 |
| CN | 105270540 A | 1/2016 |
| CN | 105404305 A | 3/2016 |
| CN | 105511609 A | 4/2016 |
| EP | 2 821 977 A1 | 1/2015 |
| FR | 3018748 A1 | 9/2015 |
| RU | 2456195 C2 | 7/2012 |
| WO | WO 2011/077638 A1 | 6/2011 |

OTHER PUBLICATIONS

Extended European Search Report for European Application No. 17152794.8-1953 dated Jul. 21, 2017.

AuthenTech-Beb Scnmanke, "Ninebot Mini, Self Balancing Hands-free Segway, 'Hoverboard 2.0!', Review," youtube, Feb. 5, 2016, https://www.youtube.comjwatch?v=HEDQixonhcY, retrieved on Jul. 12, 2017.

Xiaomi, "Ninebot Mini Scooter Content," Dec. 31, 2015, XP055389571, http://files.xiaomi-mi.com/files/Ninebot_Mini/Ninebot_Mini_Instr-EN.pdf, retrieved on Jul. 10, 2017.

English translation of International Search Report issued by the State Intellectual Property Office of the People's Republic of China dated Jan. 26, 2017 in International Application No. PCT/CN2016/098194.

K. Nomura et al., "Relation Analysis between Balance Ability in Daily Life and Process of Attaining Riding Skill for Unstable Vehicles", The 57th Automatic Control Association Lecture, pp. 1552-1555, Nov. 2014.

Hiroaki Nishiuchi et al., "A Fundamental Analysis of Segway's Running Behavior Focusing on Riders' Experience," Proceedings of the Japan Society of Civil Engineers D3, vol. 68, No. 5, pp. I_917-I_927, 2012.

* cited by examiner

METHOD AND DEVICE FOR SAFETY DRIVING

CROSS-REFERENCE TO RELATED APPLICATIONS

This application is based upon and claims priority to Chinese Patent Application 201610465407.0, filed on Jun. 23, 2016, the entire contents of which are incorporated herein by reference.

TECHNICAL FIELD

The present disclosure relates to the technical art of smart self-balancing vehicle, and more particularly, to a method and a device for safety driving and riding.

BACKGROUND

A smart self-balancing vehicle (or smart self-balancing bike) is also known as Sensor Controlled Vehicle (SCV), Segway, or the like. Currently, commercial available smart self-balancing vehicles mainly include a double wheeled type and a unicycle type. The smart self-balancing vehicle is operated mainly based on a so-called basic principle of "dynamic stabilization", which may keep the vehicle balanced by detecting change of the attitude of the vehicle using a gyroscope and an acceleration sensor that are built-in and driving a motor to perform corresponding adjustment using a servo control system.

In the related art, for the safety of the rider, several designs, such as limiting a top speed of the smart self-balancing vehicle, are made in the smart self-balancing vehicle. However, each rider may have different riding experience, and thus it is difficult to formulate a unified scheme for protecting the riders.

SUMMARY

According to a first aspect of the embodiments of the present disclosure, there is provided a method for safety driving, including: acquiring riding data of a current user of a self-balancing vehicle; comparing the acquired riding data with riding data corresponding to a plurality of preset user levels; and determining a user level of the current user of the self-balancing vehicle according to a result of the comparing. The riding data includes one or more of the following data: a riding time, a riding distance, a shaking frequency, a shaking arc magnitude, and a shaking time.

According to a second aspect of embodiments of the present disclosure, there is provided a device for safety driving, including: a processor; and a memory for storing instructions executable by the processor. The processor is configured to perform: acquiring riding data of a current user of a self-balancing vehicle; comparing the acquired riding data with riding data corresponding to a plurality of preset user levels; and determining a user level of the current user of the self-balancing vehicle according to a result of the comparing. The riding data includes one or more of the following data: a riding time, a riding distance, a shaking frequency, a shaking arc magnitude, and a shaking time.

According to a third aspect of embodiments of the present disclosure, there is provided a non-transitory computer-readable storage medium storing instructions, executable by a processor in a terminal, for performing a method for safety driving. The method includes: acquiring riding data of a current user of a self-balancing vehicle; comparing the acquired riding data with riding data corresponding to a plurality of preset user levels; and determining a user level of the current user of the self-balancing vehicle according to a result of the comparing.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
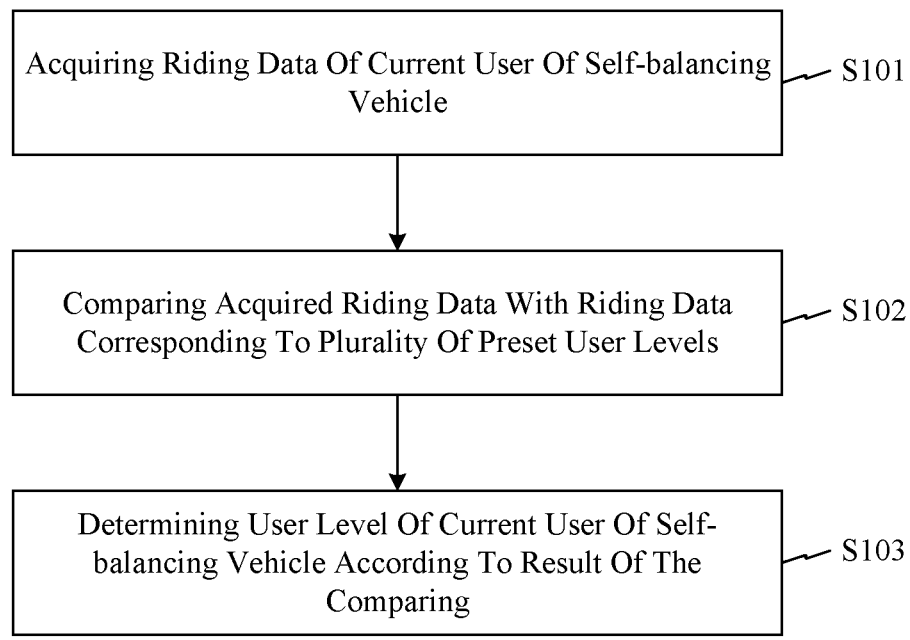
FIG. 1 is a flow chart illustrating a method for safety driving, according to an exemplary embodiment.

FIG. 1 is a flow chart of a method for safety driving, according to an exemplary embodiment. Referring to FIG. 1, the method includes the following steps S101-S103.

In step S101, riding data of a current user of a self-balancing vehicle is acquired.

In step S102, the acquired riding data is compared with riding data corresponding to a plurality of preset user levels.

In step S103, a user level of the current user of the self-balancing vehicle is determined according to a result of the comparing.

According to the above method of the embodiment of the present disclosure, riding data of a current user of a self-balancing vehicle is acquired, the riding data is compared with riding data corresponding to preset user levels, and a user level of the current user of the self-balancing vehicle is determined according to a result of the comparing. Accordingly, after determining the rider's user level, the rider may be reminded to adjust the speed, the acceleration, etc., of the self-balancing vehicle according to his/her own level, so as to keep the rider safe.

In one embodiment, the riding data may include one or more of the following data: a riding time, a riding distance, a shaking frequency, a shaking arc magnitude, and a shaking time.

Figure 2:
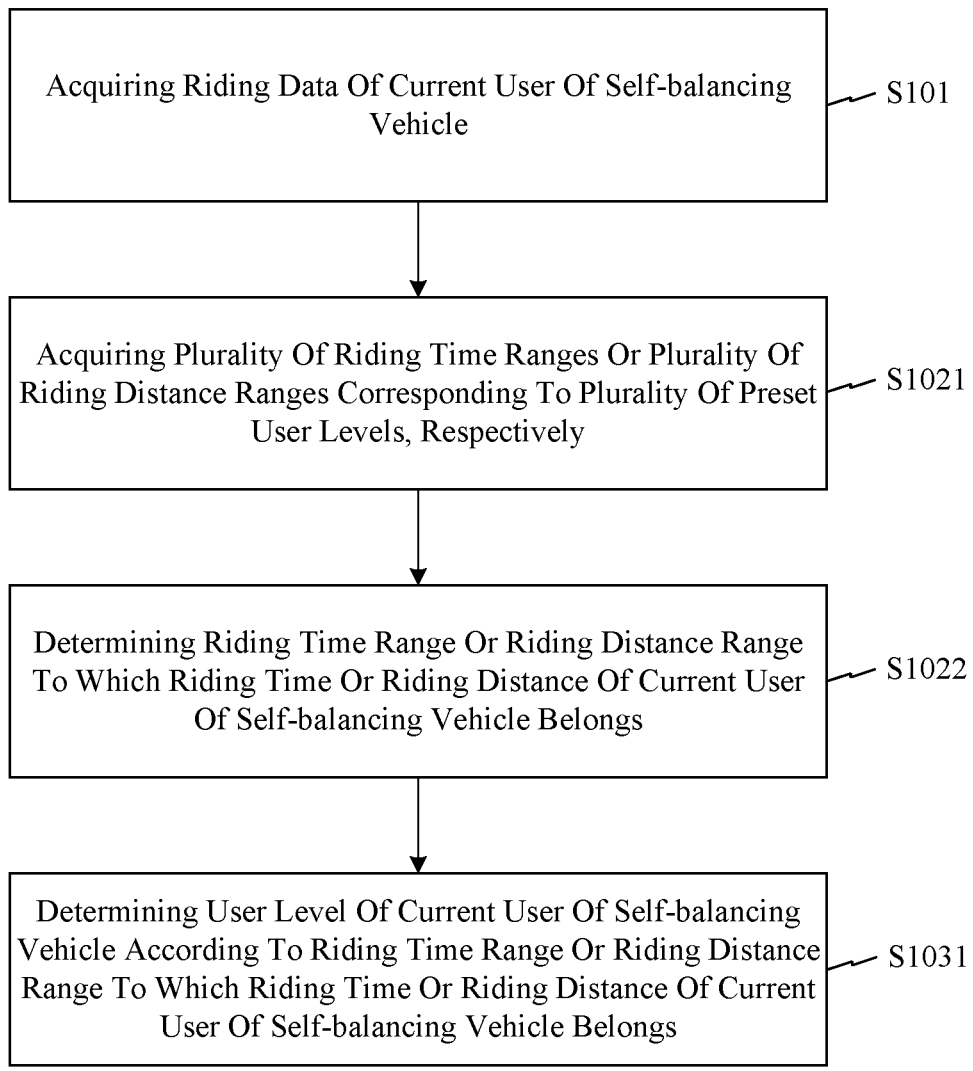
FIG. 2 is a flow chart illustrating another method for safety driving, according to an exemplary embodiment.

In one embodiment, the riding data includes the riding time or the riding distance. As illustrated in FIG. 2, the step S102 (FIG. 1) may be implemented as the following steps S1021-S1022.

In step S1021, a plurality of riding time ranges or a plurality of riding distance ranges corresponding to the plurality of preset user levels are acquired, respectively.

In step S1022, a riding time range or a riding distance range to which the riding time or the riding distance of the current user of the self-balancing vehicle belongs is determined.

At this time, the step S103 (FIG. 1) may be implemented as the following step S1031.

In step S1031, the user level of the current user of the self-balancing vehicle is determined according to the riding time range or the riding distance range to which the riding time or the riding distance of the current user of the self-balancing vehicle belongs.

The user level may be set according to the riding time or the riding distance of the user.

For example, the user level is set according to the riding time.

If the user is beginning to use the self-balancing vehicle (the riding time is 0-30 hours, which may be set according to actual situation), the user is determined as a beginner.

If the user has used the self-balancing vehicle for 30-80 hours, the user is determined as a primary user.

If the user has used the self-balancing vehicle for 80-200 hours, the user is determined as an intermediate user.

If the user has used the self-balancing vehicle for over 200 hours, the user is determined as an advanced user.

As another example, the user level is set according to the riding distance.

If the user has ridden the self-balancing vehicle for 0-20 km (the distance may be changed according to actual situation), the user is determined as a beginner.

If the user has ridden the self-balancing vehicle for 20-60 km, the user is determined as a primary user.

If the user has ridden the self-balancing vehicle for 60-200 km, the user is determined as an intermediate user.

If the user has ridden the self-balancing vehicle for over 200 km, the user is determined as an advanced user.

For example, if the riding time of a user is 50 hours, the user is determined as a primary user. In the present embodiment, by determining the user level using the riding time or riding distance, the user level may be determined simply and quickly.

In one embodiment, the riding data includes the shaking frequency, the shaking arc magnitude, and the shaking time.

Figure 3:
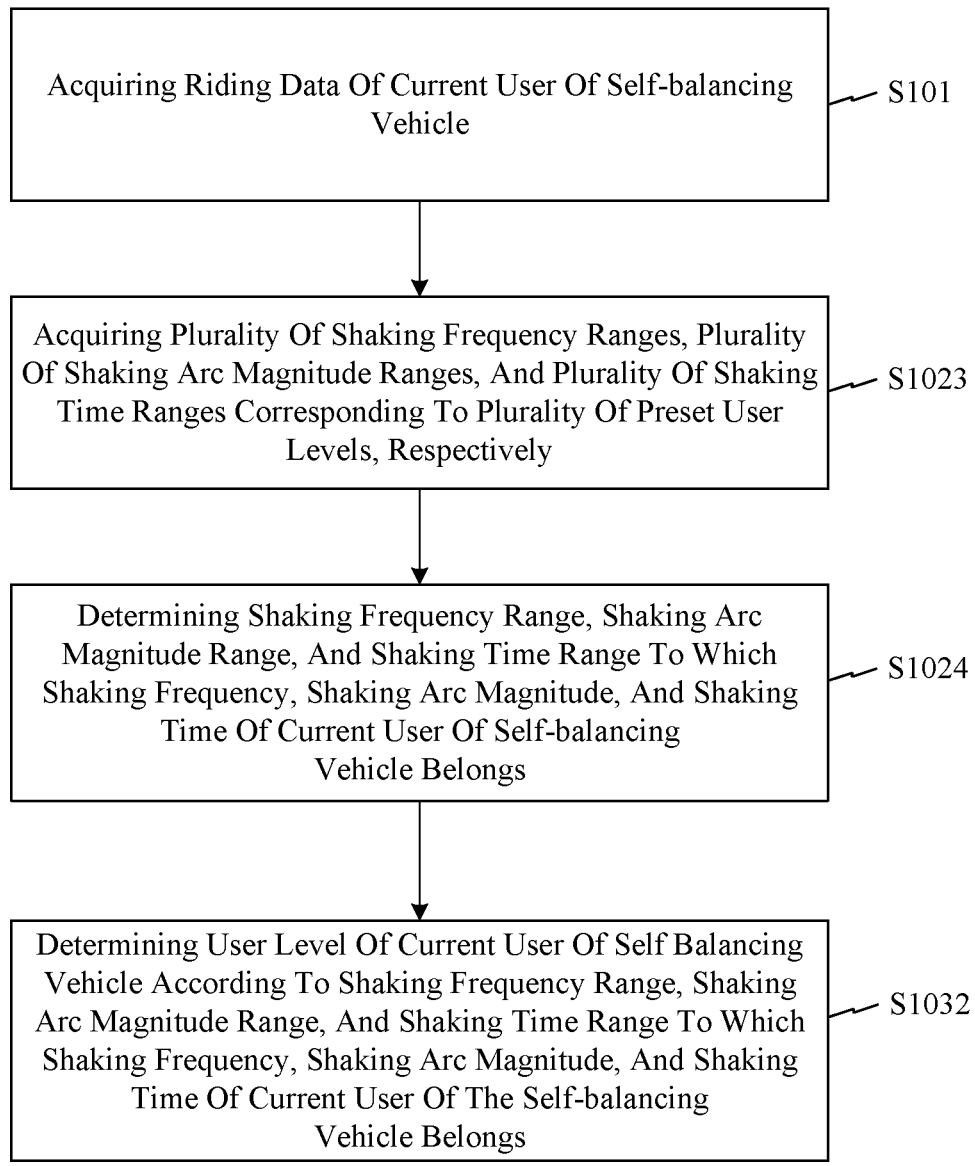
FIG. 3 is a flow chart illustrating another method for safety driving, according to an exemplary embodiment.

As illustrated in FIG. 3, the step S102 (FIG. 1) may be further implemented as the following steps S1023-S1024.

In step S1023, a plurality of a shaking frequency ranges, a plurality of shaking arc magnitude ranges, and a plurality of shaking time ranges corresponding to the plurality of preset user levels are acquired, respectively.

In step S1024, a shaking frequency range, a shaking arc magnitude range, and a shaking time range to which the shaking frequency, the shaking arc magnitude and the shaking time of the current user of the self-balancing vehicle belong, respectively, are determined.

At this time, the step S103 (FIG. 1) may be further implemented as the following step S1032.

In step S1032, the user level of the current user of the self-balancing vehicle is determined according to the shaking frequency range, the shaking arc magnitude range, and the shaking time range to which the shaking frequency, the shaking arc magnitude, and the shaking time of the current user of the self-balancing vehicle belongs, respectively.

The user level may also be set according to cycling proficiency of the user of the self-balancing vehicle. The self-balancing vehicle is provided with a leveling sensor, and the user level may be judged according to the shaking frequency, shaking arc magnitude, and the shaking time.

The shaking frequency range, the shaking arc magnitude range, and the shaking time range corresponding to the preset user level may be preset. For example, when the user level is beginner, the shaking time range may be set as 20 seconds to 50 seconds, the shaking frequency range may be set as 1 time per second to two times per second, and the shaking arc magnitude range may be set as 15 degrees to 30 degrees. When the riding data of the user belongs to these ranges, the user level of the user is determined as beginner.

For example, if the user shakes 20 times (the number may be set according to actual requirement) during 30 seconds riding of the self-balancing vehicle, and each shake reaches an arc magnitude of 20 degrees, the user is determined as a beginner.

If the user shakes two or three times during 1 minute riding of the self-balancing vehicle, and each shake reaches an arc magnitude of 10 degrees, the user is determined as a primary user.

If the user shakes slightly during the riding of the self-balancing vehicle, the user is determined as an intermediate user.

If no repeated sudden shake occurs during the riding of the self-balancing vehicle for a certain period of time, the user is determined as an advanced user.

In one embodiment, the above method may further include a step A.

In the step A, when the riding data includes at least the shaking frequency, the shaking arc magnitude, and the shaking time, the user level of the current user of the self-balancing vehicle may be determined to be the user level determined according to the shaking frequency, the shaking arc magnitude, and the shaking time of the current user of the self-balancing vehicle.

When the riding data includes the shaking frequency, the shaking arc magnitude, and the shaking time, the user level of the current user of the self-balancing vehicle is determined directly according to the shaking frequency, the shaking arc magnitude, and the shaking time, regardless of the data such as the riding distance and the riding time. That is, the judgment condition of determining the user level according to the shaking frequency, the shaking arc magnitude, and the shaking time has the highest priority. For example, if the user has a frequently shaking and large shaking angle, the user level is determined directly regardless of the riding time and the riding distance of the user.

In the present embodiment, the shaking frequency, the shaking arc magnitude and the shaking time may represent to some extent the cycling proficiency of the user. Although it is more complex to determine the user level according to the cycling proficiency of the user than to determine the user level according to the riding time or riding distance, the user level determined according to the cycling proficiency is more accurate.

Figure 4:
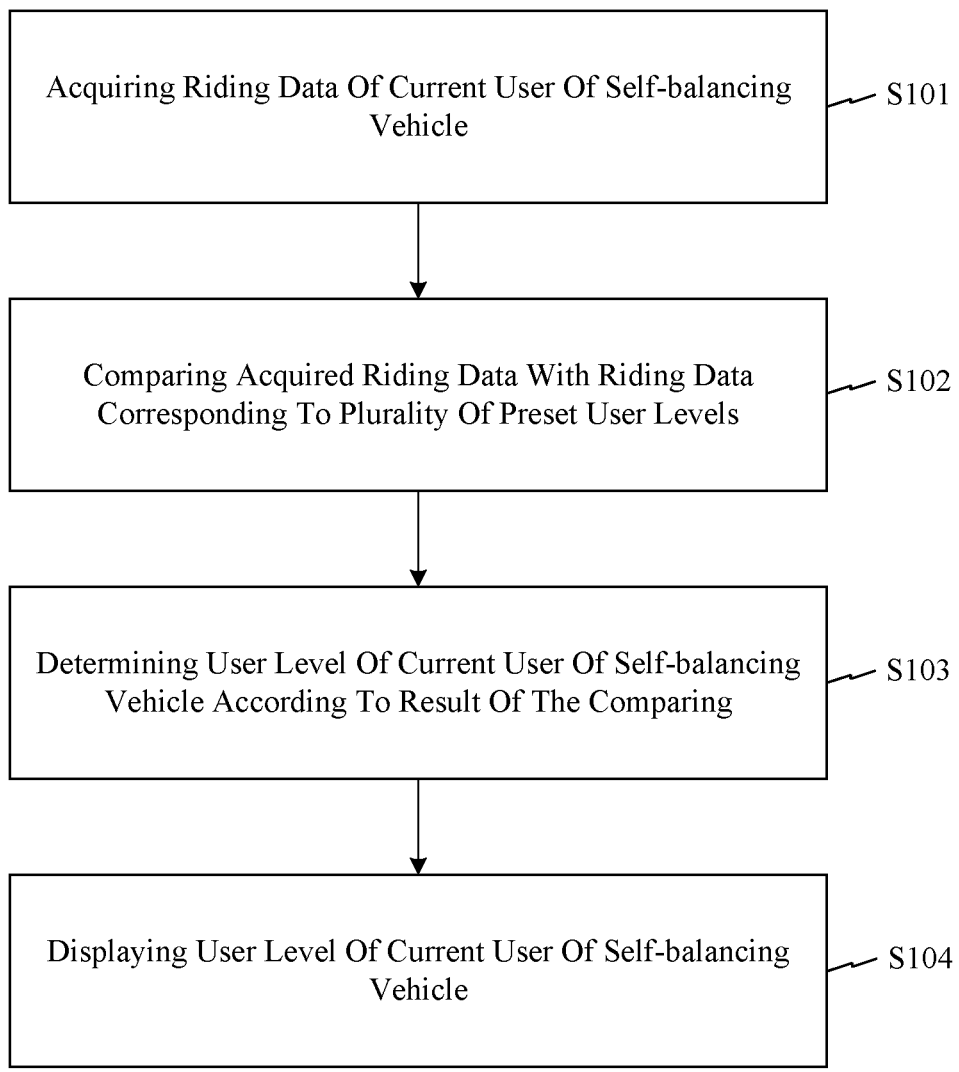
FIG. 4 is a flow chart illustrating another method for safety driving, according to an exemplary embodiment.

In the present embodiment, as illustrated in FIG. 4, the above method may further include step S104.

In step S104, the user level of the current user of the self-balancing vehicle may be displayed.

The user may acknowledge the user level by other means. Alternatively, the user level may be displayed to the user on a screen, such that the user may have a more intuitive acknowledgement.

Figure 5:
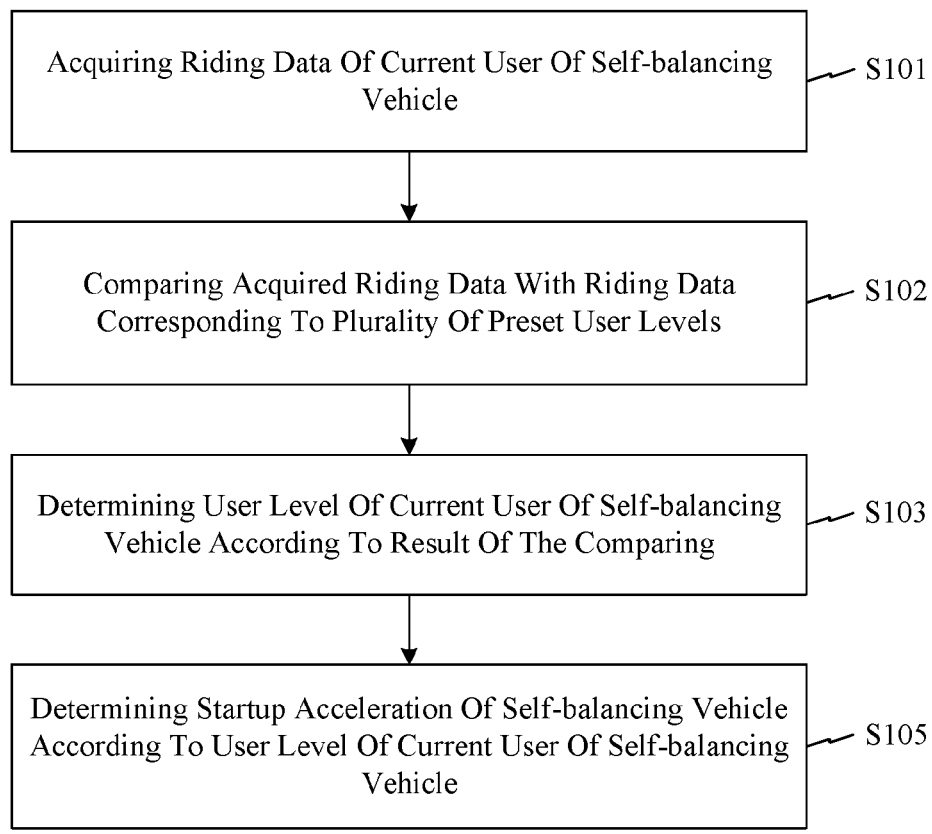
FIG. 5 is a flow chart illustrating further another method for safety driving, according to an exemplary embodiment.

In one embodiment, as illustrated in FIG. 5, after the step S103, the above method may further include step S105.

In step S105, a startup acceleration of the self-balancing vehicle is determined according to the user level of the current user of the self-balancing vehicle.

A startup acceleration of a vehicle is represented as $a=(V_{end}-V_{start})$ t, where $V_{start}$ is a starting velocity of the vehicle, $V_{end}$ is an end velocity of the vehicle, and t is the time for the velocity of the vehicle to change from the starting velocity $V_{start}$ to the end velocity $V_{end}$. For example, in the case where a vehicle takes 8 seconds to accelerate from 0 to 100 km/h (0-100 km/h) during its startup, the startup acceleration "a" of the vehicle is calculated as 3.47 m/s$^2$.

The self-balancing vehicle has more critical dangerous degree during its start than during its cruising. In the present embodiment, speed-limiting protection is performed during the startup of the self-balancing vehicle according to the user level, thereby lowering the risk of the user getting hurt.

Figure 6:
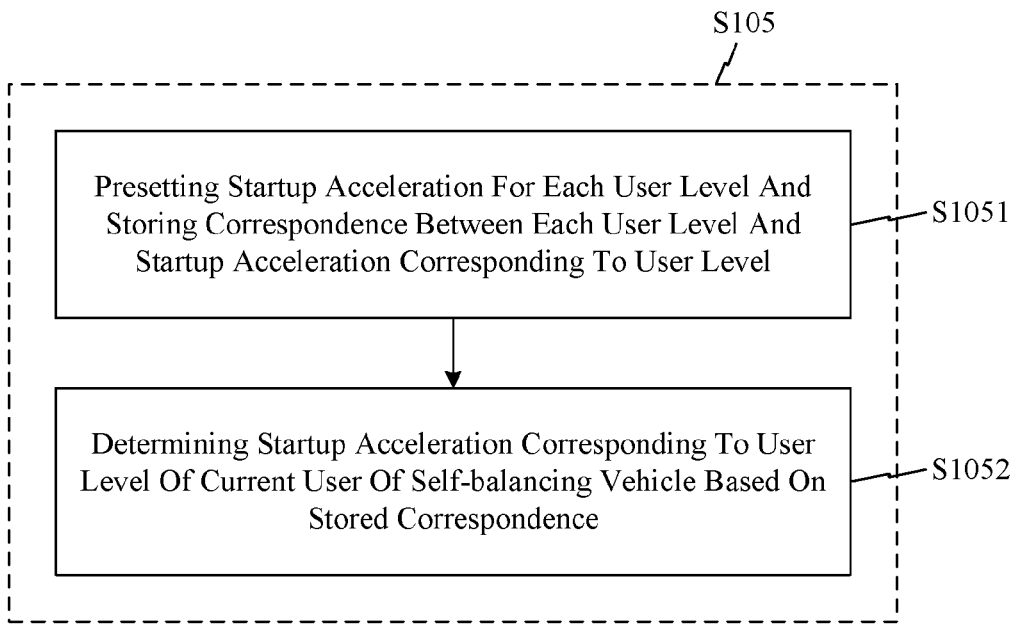
FIG. 6 is a flow chart illustrating the step of determining a startup acceleration of the self-balancing vehicle in a method for safety driving, according to an exemplary embodiment.

In one embodiment, as illustrated in FIG. 6, the step S105 may be implemented as the following steps S1051-S1052.

In step S1051, the startup acceleration of the self-balancing vehicle for each user level is preset and a correspondence between each user level and the startup acceleration corresponding to the user level is stored.

In step S1052, the startup acceleration corresponding to the user level of the current user of the self-balancing vehicle is determined based on the stored correspondence.

The startup acceleration of the self-balancing vehicle is set according to the user level.

The correspondence between each user level and the startup acceleration of the self-balancing vehicle may be set as follow.

The startup acceleration for a beginner is limited to 0-16 KM/h>8 s.

The startup acceleration for a primary user is limited to 0-16 KM/h>7 s.

The startup acceleration for an intermediate user is limited to 0-16 KM/h>5 s.

The startup acceleration for an advanced user is limited to 0-16 KM/h>3 s.

The above data may be set according to actual requirements.

Figure 7:
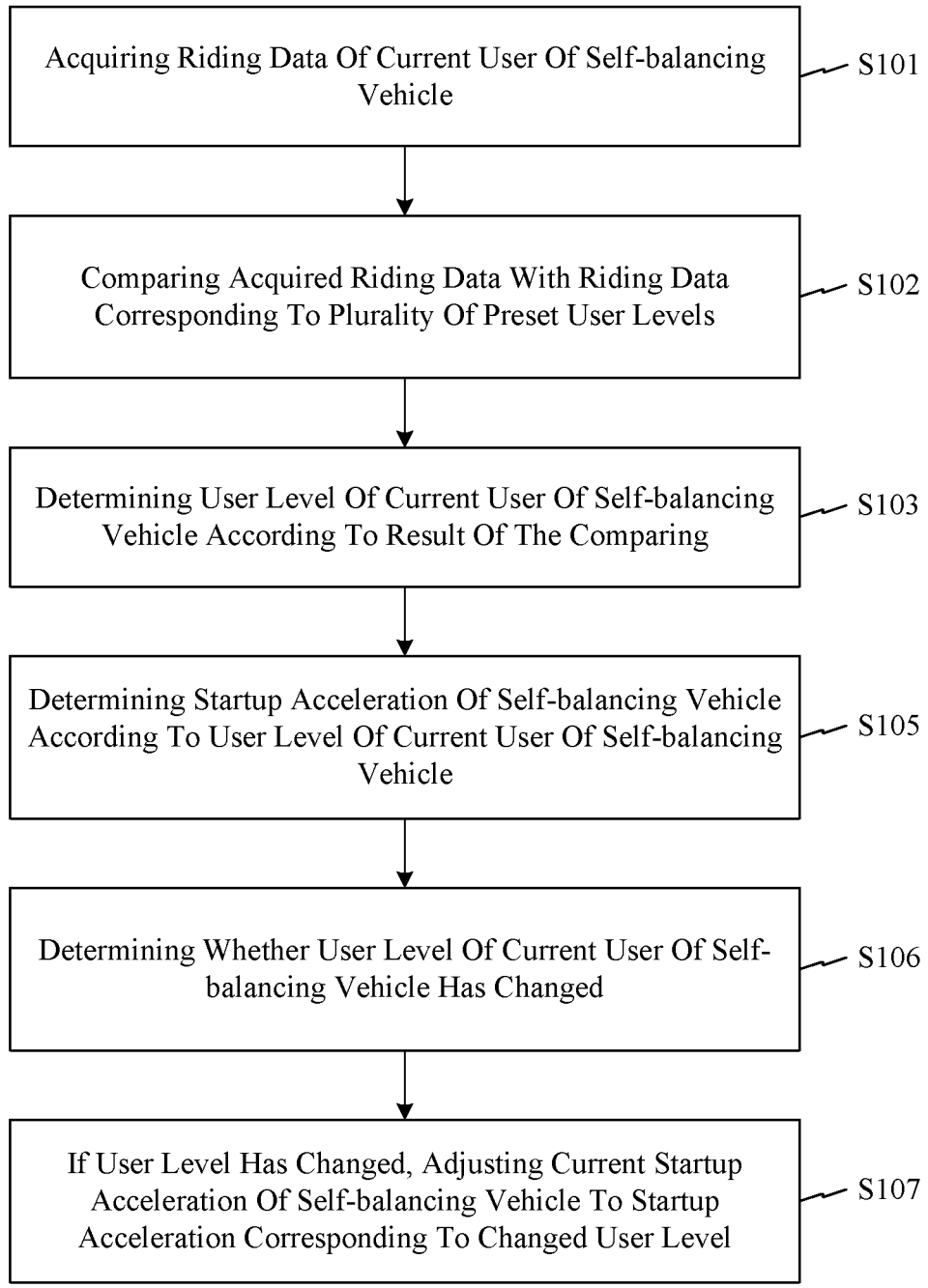
FIG. 7 is a flow chart illustrating another method for safety driving, according to an exemplary embodiment.

In one embodiment, as illustrated in FIG. 7, the above method may further include steps S106-S107.

In step S106, it is determined whether the user level of the current user of the self-balancing vehicle has changed.

In step S107, if the user level has changed, the current startup acceleration of the self-balancing vehicle is adjusted to be the startup acceleration corresponding to the changed user level.

In the present embodiment, upon detection that the user level has change, e.g., the user becomes more proficient and changes his user level from the primary user to the intermediate user, the user level of the user of the self-balancing vehicle is adjusted and the startup acceleration of the self-balancing vehicle is adjusted to correspond to the adjusted user level, thereby satisfying the user's requirement.

Figure 8:
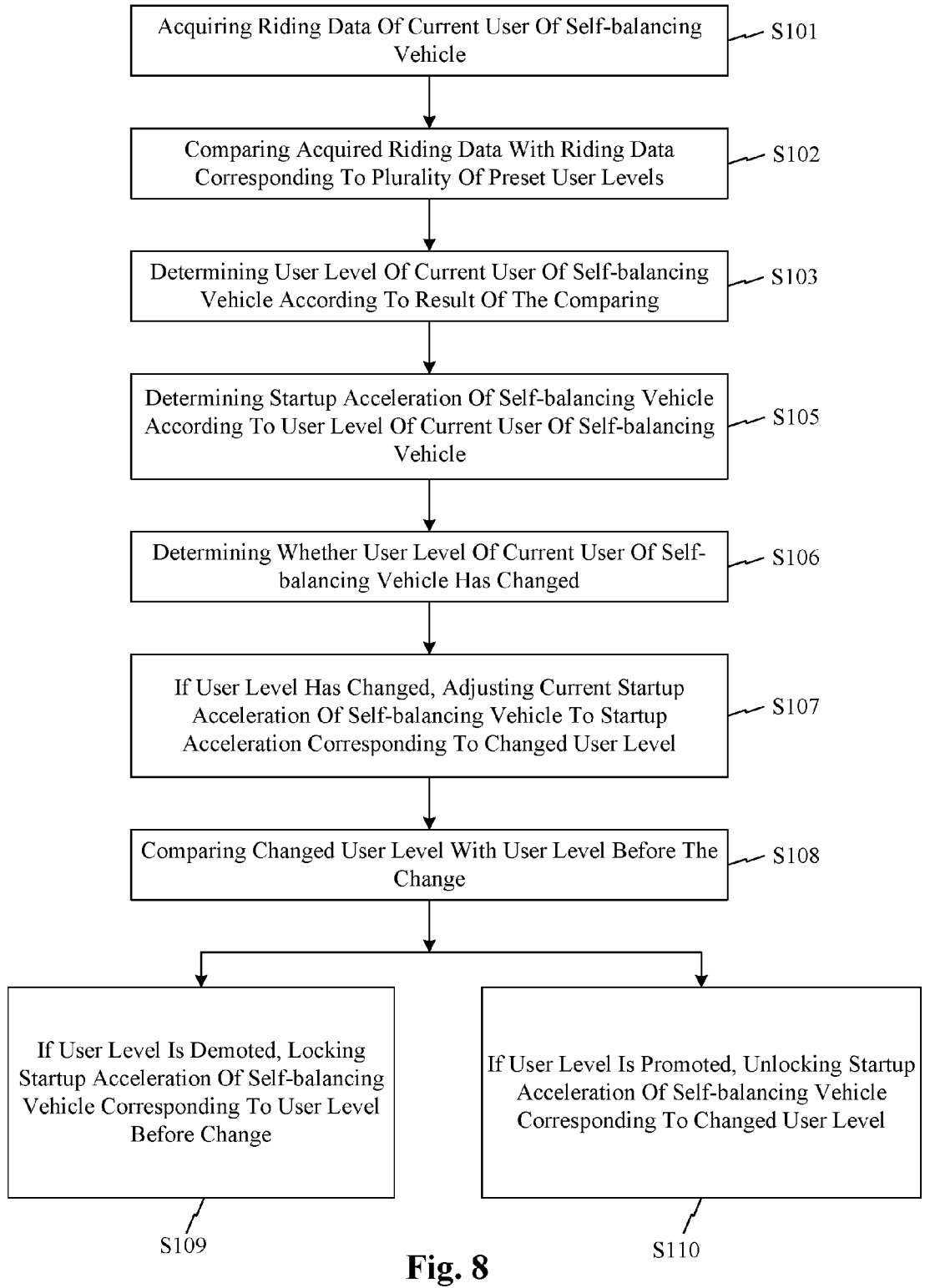
FIG. 8 is a flow chart illustrating another method for safety driving, according to an exemplary embodiment.

In one embodiment, as illustrated in FIG. 8, the above method may further include steps S108-S110.

In step S108, the changed user level is compared with the user level before the change.

In step S109, if the user level is demoted, the startup acceleration of the self-balancing vehicle corresponding to the user level before the change is locked, and the locked startup acceleration is no longer allowed to be used.

In step S110, if the user level is promoted, the startup acceleration of the self-balancing vehicle corresponding to the changed user level is unlocked. That is, the startup acceleration of the self-balancing vehicle is changed to the startup acceleration corresponding to the changed user level.

If the self-balancing vehicle detects the user level change in real time, the startup acceleration of the self-balancing vehicle is correspondingly unlocked or locked.

If it is detected that the user is promoted from the beginner to the primary user, the startup acceleration corresponding to the user level before the change is automatically unlocked and raised from the previous 1-16 km/h>8 s to 1-16 km/h>7 s. If it is detected that the user is driving/riding the self-balancing vehicle with a decreased stability, the user level may be demoted in real time to keep the user safe. For example, the startup acceleration is lowered from the previous 1-16 km/h>7 s to 1-16 km/h>8 s.

The gradual locking and unlocking is mainly performed by judging the user level of the user (by judging according to the riding time, the riding distance, the shaking frequency, the shaking arc magnitude, and the shaking time when the user is riding the vehicle), and upon detection of the change of the user level (demoting or promoting), the self-balancing vehicle automatically adjusts the startup acceleration of the corresponding level.

In the present embodiment, by gradually locking or unlocking the startup acceleration of the self-balancing vehicle, it may ensure the user's deriving/riding safety.

The following is embodiments of devices according to the present disclosure, which may be configured to perform the embodiments of methods of the present disclosure.

Figure 9:
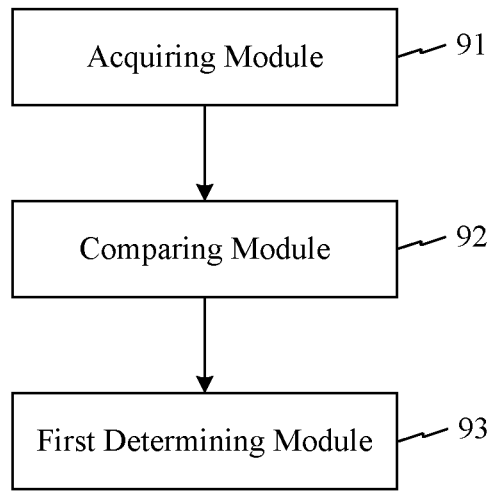
FIG. 9 is a block diagram of a device for safety driving, according to an exemplary embodiment.

FIG. 9 is a block diagram of a device for safety driving according to an exemplary embodiment, and the device may be implemented as part or whole of an electrical apparatus by software, hardware, or a combination of both. As illustrated in FIG. 9, the device for safety driving includes the following components.

An acquiring module 91 is configured to acquire riding data of a current user of a self-balancing vehicle.

A comparing module 92 is configured to compare the acquired riding data with riding data corresponding to a plurality of preset user levels.

A first determining module 93 is configured to determining a user level of the current user of the self-balancing vehicle according to a result of the comparing.

In one embodiment, the riding data may include one or more of the following data: a riding time, a riding distance, a shaking frequency, a shaking arc magnitude, and a shaking time.

In one embodiment, the riding data includes the riding time or the riding distance.

The comparing module 92 may include the following components.

A first acquiring sub module is configured to acquire a plurality of riding time ranges or a plurality of riding distance ranges corresponding to the plurality of preset user levels, respectively.

A first determining sub module is configured to determine a riding time range or a riding distance range to which the riding time, or the riding distance of the current user of the self-balancing vehicle belongs.

The first determining module 93 may include the following component.

A second determining sub module configured to determine the user level of the current user of the self-balancing vehicle according to the riding time range or the riding distance range to which the riding time or the riding distance of the current user of the self-balancing vehicle belongs.

In one embodiment, the riding data includes the shaking frequency, the shaking arc magnitude, and the shaking time.

The comparing module 92 may further include the following components.

A second acquiring sub module is configured to acquire a plurality of shaking frequency ranges, a plurality of shaking arc magnitude ranges, and a plurality of shaking time ranges corresponding to the plurality of preset user levels, respectively.

A third determining sub module is configured to determine a shaking frequency range, a shaking arc magnitude range, and a shaking time range to which the shaking frequency, the shaking arc magnitude, and the shaking time of the current user of the self-balancing vehicle belongs, respectively.

The first determining module 93 may further include the following component.

A fourth determining sub module is configured to determine the user level of the current user of the self-balancing vehicle according to the shaking frequency range, the shaking arc magnitude range, and the shaking time range to which the shaking frequency, the shaking arc magnitude and the shaking time of the current user of the self-balancing vehicle belongs, respectively.

In one embodiment, when the riding data includes at least the shaking frequency, the shaking arc magnitude, and the shaking time, the device may further include the following component.

A second determining module is configured to determine the user level of the current user of the self-balancing vehicle as the user level determined according to the shaking frequency, the shaking arc magnitude, and the shaking time of the current user of the self-balancing vehicle.

Figure 10:
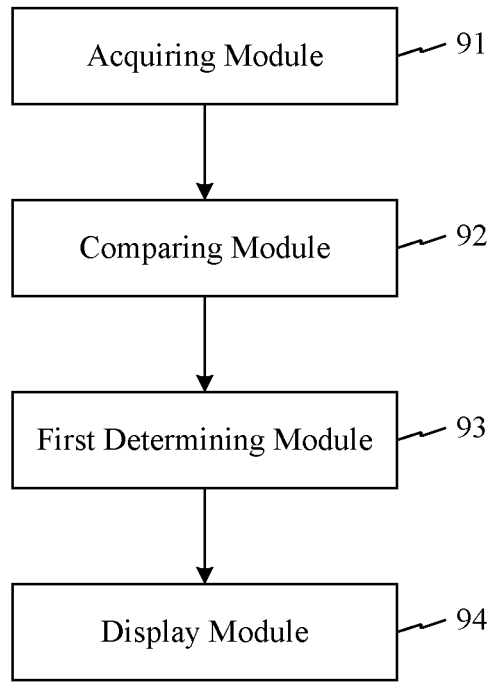
FIG. 10 is a block diagram of another device for safety driving, according to an exemplary embodiment.

In one embodiment, as illustrated in FIG. 10, the device may further include the following component.

A display module 94 is configured to display the user level of the current user of the self-balancing vehicle.

Figure 11:
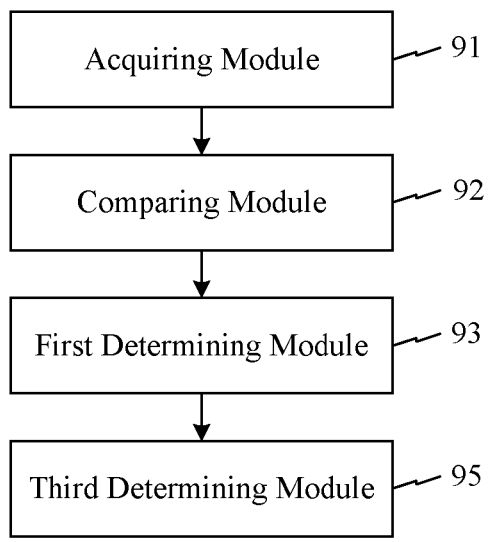
FIG. 11 is a block diagram of another device for safety driving, according to an exemplary embodiment.

In one embodiment, as illustrated in FIG. 11, the device may further include the following component.

A third determining module 95 is configured to determine a startup acceleration of the self-balancing vehicle according to the user level of the current user of the self-balancing vehicle.

In one embodiment, the third determining module 95 may include the following components.

A storage sub module is configured to preset the startup acceleration for each user level and store a correspondence between each user level and the startup acceleration corresponding to the user level.

A fifth determining sub module is configured to determine the startup acceleration corresponding to the user level of the current user of the self-balancing vehicle based on the stored correspondence.

Figure 12:
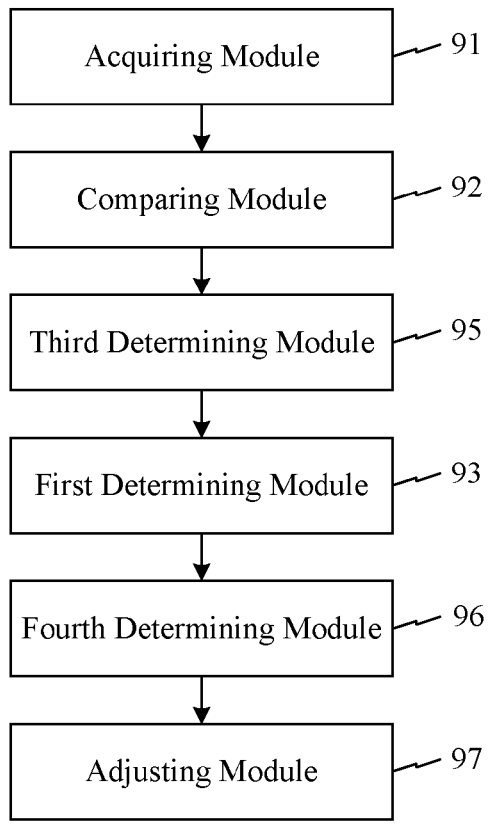
FIG. 12 is a block diagram of further another device for safety driving, according to an exemplary embodiment.

In one embodiment, as illustrated in FIG. 12, the device may further include the following components.

A fourth determining module 96 is configured to determine whether the user level of the current user of the self-balancing vehicle has changed.

An adjusting module 97 is configured to adjust the current startup acceleration of the self-balancing vehicle to the startup acceleration corresponding to the changed user level, if the user level has changed.

Figure 13:
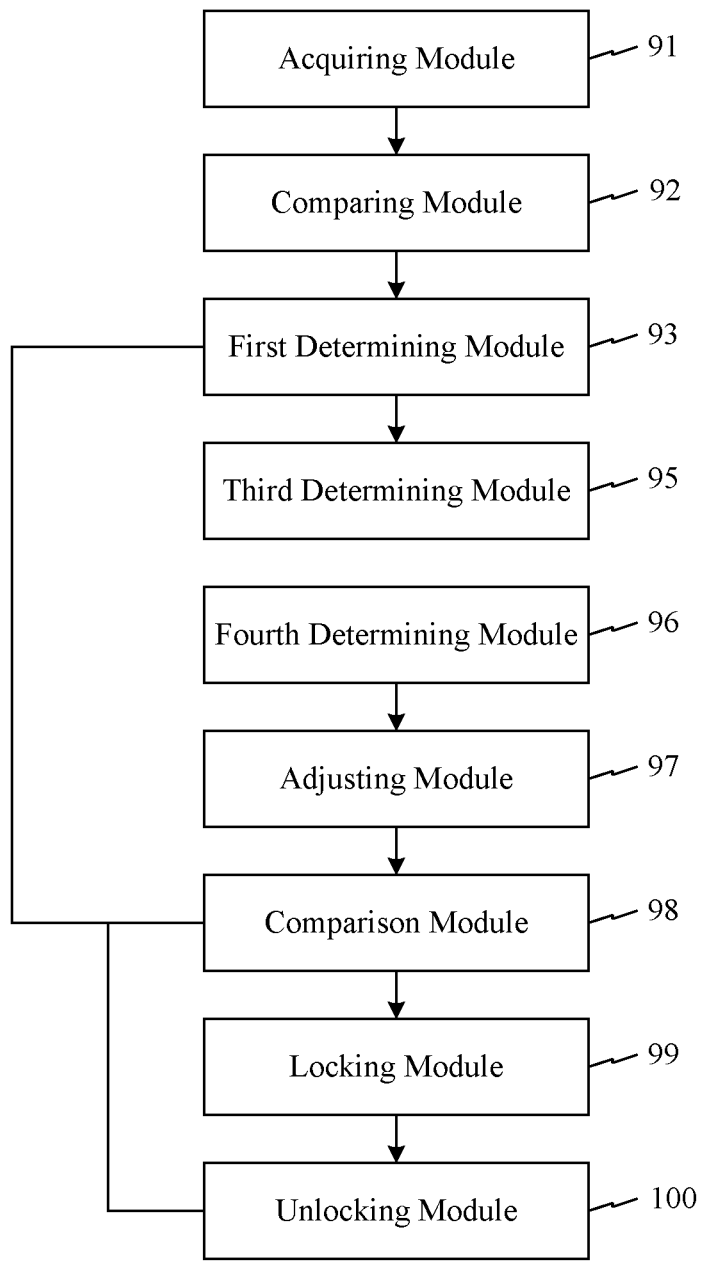
FIG. 13 is a block diagram of still another device for safety driving, according to an exemplary embodiment.

In one embodiment, as illustrated in FIG. 13, the device may further include the following components.

A comparison module 98 is configured to compare the changed user level with the user level before the change.

A locking module 99 is configured to lock the startup acceleration of the self-balancing vehicle corresponding to the user level before the change, if the user level is demoted.

An unlocking module 100 is configured to unlock the startup acceleration of the self-balancing vehicle corresponding to the user level before the change and change the startup acceleration of the self-balancing vehicle corresponding to the user level before the change to the startup acceleration corresponding to the changed user level, if the user level is promoted.

According to the above device of the embodiments of the present disclosure, riding data of a current user of a self-balancing vehicle is acquired, the acquired riding data is compared with riding data corresponding to a plurality of preset user levels, and a user level of the current user of the self-balancing vehicle is determined according to a result of the comparing. Accordingly, after the rider has acknowledged his/her own level, the rider may be reminded to adjust the speed, the acceleration, etc., of the self-balancing vehicle according to his/her own level, so as to keep the rider safe.

Embodiments of the present disclosure further provides a device for safety driving, the device includes a processor and a memory for storing instructions executable by the processor.

The processor is configured to perform: acquiring riding data of a current user of a self-balancing vehicle; comparing the acquired riding data with riding data corresponding to a plurality of preset user levels; and determining a user level of the current user of the self-balancing vehicle according to a result of the comparing.

The riding data may include one or more of the following data: a riding time, a riding distance, a shaking frequency, a shaking arc magnitude, and a shaking time.

In one embodiment, the riding data includes the riding time or the riding distance. The above processor may be further configured to perform: acquiring a plurality of riding time ranges or a plurality of riding distance ranges corresponding to the preset user levels, respectively; determining the riding time range or the riding distance range to which the riding time or the riding distance of the current user of the self-balancing vehicle belongs; and determining the user level of the current user of the self-balancing vehicle according to the riding time range or the riding distance range to which the riding time or the riding distance of the current user of the self-balancing vehicle belongs.

In one embodiment, the riding data includes the shaking frequency, the shaking arc magnitude, and the shaking time. The above processor may be further configured to perform: acquiring a plurality of shaking frequency ranges, a plurality of shaking arc magnitude ranges, and a plurality of shaking time ranges corresponding to the preset user levels, respectively; determining the shaking frequency range, the shaking arc magnitude range, and the shaking time range to which the shaking frequency, the shaking arc magnitude, and the shaking time of the current user of the self-balancing vehicle belong, respectively; and determining the user level of the current user of the self-balancing vehicle according to the shaking frequency range, the shaking arc magnitude range, and the shaking time range to which the current user of the self-balancing vehicle belongs.

The above processor may be further configured to perform: displaying the user level of the current user of the self-balancing vehicle.

The above processor may be further configured to perform: determining a startup acceleration of the self-balancing vehicle according to the user level of the current user of the self-balancing vehicle.

The above processor may be further configured to perform: presetting the startup acceleration for each user level and storing a correspondence between each user level and the startup acceleration corresponding to the user level; and determining the startup acceleration corresponding to the user level of the current user of the self-balancing vehicle based on the stored correspondence.

The above processor may be further configured to perform: determining whether the user level of the current user of the self-balancing vehicle has changed; and if the user level has changed, adjusting the current startup acceleration of the self-balancing vehicle to the startup acceleration corresponding to the changed user level.

The above processor may be further configured to perform: comparing the changed user level with the user level before the change; if the user level is demoted, locking the startup acceleration of the self-balancing vehicle corresponding to the user level before the change; and if the user level is promoted, unlocking the startup acceleration of the self-balancing vehicle corresponding to the user level before the change and changing the startup acceleration of the self-balancing vehicle corresponding to the user level before the change to the startup acceleration corresponding to the changed user level.

Figure 14:
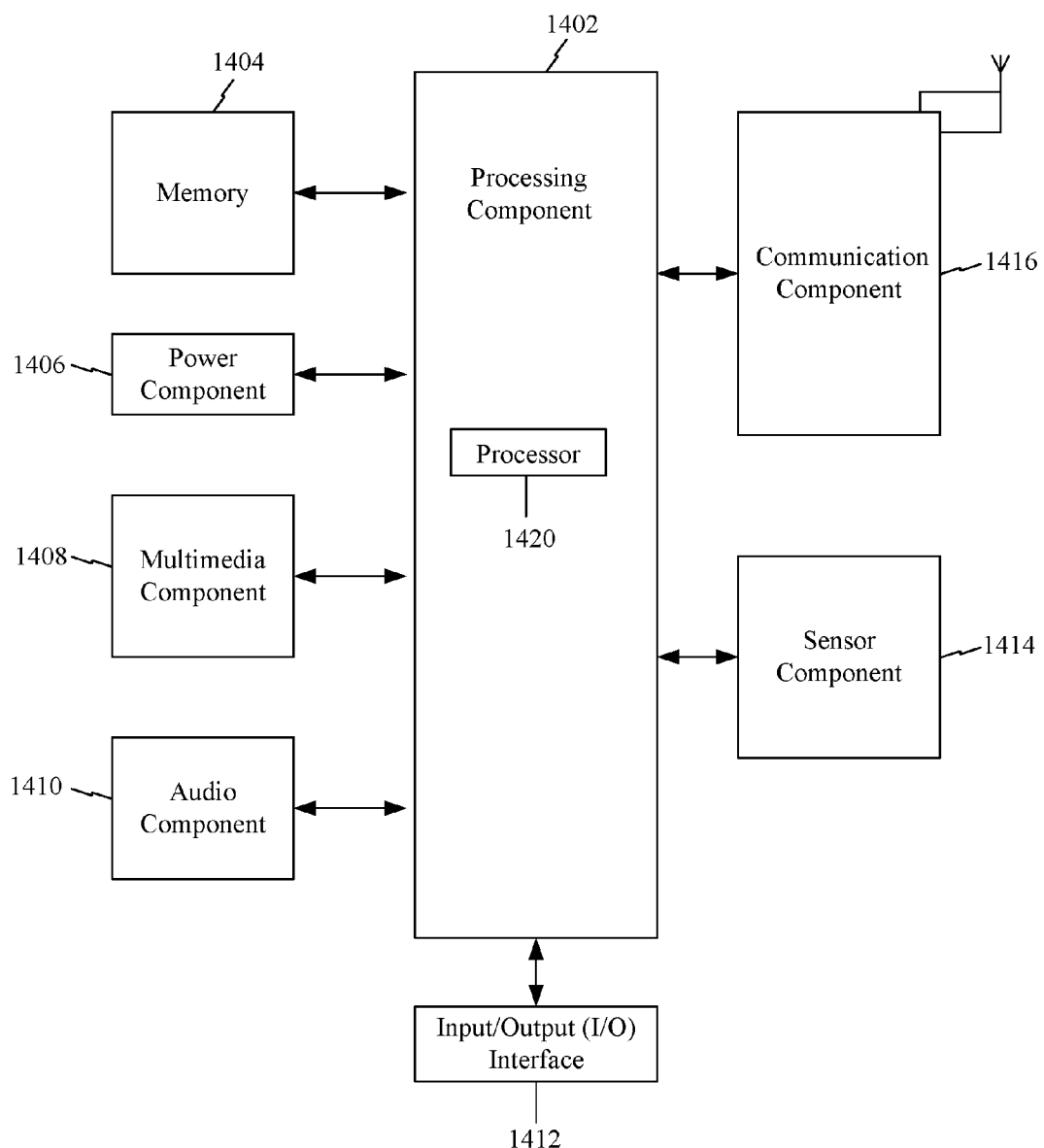
FIG. 14 is a block diagram of a device for safety driving, according to an exemplary embodiment.

FIG. 14 is a block diagram of a device 1400 for safety driving, according to an exemplary embodiment. For example, the device 1400 may be an apparatus for use with a smart self-balancing vehicle, or a smart self-balancing vehicle.

The device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phone-book data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G, or 3G or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1404, executable by the processor 1420 in the device 1400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium and, when instructions in the storage medium are executed by the processor 1420 of the device 1400, the instructions cause the device 1400 to perform the above-described method for safety driving, wherein the method include: acquiring riding data of a current user of a self-balancing vehicle; comparing the acquired riding data with riding data corresponding to a plurality of preset user levels; and determining a user level of the current user of the self-balancing vehicle according to a result of the comparing.

In one embodiment, the riding data may include one or more of the following data: a riding time, a riding distance, a shaking frequency, a shaking arc magnitude, and a shaking time.

In one embodiment, the riding data includes the riding time or the riding distance. The comparing the acquired riding data with riding data corresponding to a plurality of preset user levels may include: acquiring a plurality of riding time ranges or a plurality of riding distance ranges corresponding to the preset user levels, respectively; and determining a riding time range or a riding distance range to which the riding time or the riding distance of the current user of the self-balancing vehicle belongs. The determining a user level of the current user of the self-balancing vehicle according to a result of the comparing may include: determining the user level of the current user of the self-balancing vehicle according to the riding time range or the riding distance range to which the riding time or the riding distance of the current user of the self-balancing vehicle belongs.

In one embodiment, the riding data includes the shaking frequency, the shaking arc magnitude, and the shaking time. The comparing the acquired riding data with riding data corresponding to a plurality of preset user levels may include: acquiring a plurality of shaking frequency ranges, a plurality of shaking arc magnitude ranges, and a plurality of shaking time ranges corresponding to the plurality of preset user levels, respectively; and determining a shaking frequency range, a shaking arc magnitude range, and a shaking time range to which the shaking frequency, the shaking arc magnitude, and the shaking time of the current user of the self-balancing vehicle belong, respectively. The determining a user level of the current user of the self-balancing vehicle according to a result of the comparing may include: determining the user level of the current user of the self-balancing vehicle according to the shaking frequency range, the shaking arc magnitude range, and the shaking time range to which the shaking frequency, the shaking arc magnitude, and the shaking time of the current user of the self-balancing vehicle belong, respectively.

In one embodiment, the method may further include: displaying the user level of the current user of the self-balancing vehicle.

In one embodiment, after determining the user level of the current user of the self-balancing vehicle according to the result of the comparing, the method may further include: determining a startup acceleration of the self-balancing vehicle according to the user level of the current user of the self-balancing vehicle.

In one embodiment, the determining a startup acceleration of the self-balancing vehicle according to the user level of the current user of the self-balancing vehicle may include: presetting the startup acceleration for each user level and storing a correspondence between each user level and the startup acceleration corresponding to the user level; and determining the startup acceleration corresponding to the user level of the current user of the self-balancing vehicle based on the stored correspondence.

In one embodiment, the method may further include: determining whether the user level of the current user of the self-balancing vehicle has changed; and if the user level is changed, adjusting current startup acceleration of the self-balancing vehicle to the startup acceleration corresponding to the changed user level.

In one embodiment, the method may further include: comparing the changed user level with the user level before the change; if the user level is demoted, locking the startup acceleration of the self-balancing vehicle corresponding to the user level before the change; and if the user level is promoted, unlocking the startup acceleration of the self-balancing vehicle corresponding to the user level before the change and changing the startup acceleration of the self-balancing vehicle corresponding to the user level before the change to the startup acceleration corresponding to the changed user level.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for safety driving, comprising:
acquiring riding data of a current user of a self-balancing vehicle;
comparing the acquired riding data with riding data corresponding to a plurality of preset user levels;
determining a user level of the current user of the self-balancing vehicle according to a result of the comparing; and
after determining the user level of the current user of the self-balancing vehicle, determining a startup acceleration of the self-balancing vehicle according to the user level of the current user of the self-balancing vehicle;
wherein the riding data comprises one or more of the following data:
a riding time, a riding distance, a shaking frequency, a shaking arc magnitude, and a shaking time.

2. The method according to claim 1, wherein the riding data comprises the riding time or the riding distance,
the comparing the acquired riding data with riding data corresponding to a plurality of preset user levels comprises:
acquiring a plurality of riding time ranges or a plurality of riding distance ranges corresponding to the plurality of preset user levels, respectively; and
determining a riding time range or a riding distance range to which the riding time or the riding distance of the current user of the self-balancing vehicle belongs, and
the determining a user level of the current user of the self-balancing vehicle according to a result of the comparing comprises:
determining the user level of the current user of the self-balancing vehicle according to the riding time range or the riding distance range to which the riding time or the riding distance of the current user of the self-balancing vehicle belongs.

3. The method according to claim 1, wherein the riding data comprises a shaking frequency, a shaking arc magnitude, and a shaking time,
the comparing the acquired riding data with riding data corresponding to a plurality of preset user levels comprises:
acquiring a plurality of shaking frequency ranges, a plurality of shaking arc magnitude ranges, and a plurality of shaking time ranges corresponding to the plurality of preset user levels, respectively; and
determining a shaking frequency range, a shaking arc magnitude range, and a shaking time range to which the shaking frequency, the shaking arc magnitude and the shaking time of the current user of the self-balancing vehicle belongs, respectively, and
the determining a user level of the current user of the self-balancing vehicle according to a result of the comparing comprises:
determining the user level of the current user of the self-balancing vehicle according to the shaking frequency range, the shaking arc magnitude range, and the shaking time range to which the shaking frequency, the shaking arc magnitude, and the shaking time of the current user of the self-balancing vehicle belongs, respectively.

4. The method according to claim 3, wherein the method further comprises: when the riding data comprises at least the shaking frequency, the shaking arc magnitude, and the shaking time,
determining the user level of the current user of the self-balancing vehicle to be the user level determined according to the shaking frequency, the shaking arc magnitude, and the shaking time of the current user of the self-balancing vehicle.

5. The method according to claim 1, further comprising:
displaying the user level of the current user of the self-balancing vehicle.

6. The method according to claim 1, wherein the determining a startup acceleration of the self-balancing vehicle according to the user level of the current user of the self-balancing vehicle comprises:
presetting the startup acceleration of the self-balancing vehicle for each user level and storing a correspondence between each user level and the startup acceleration corresponding to the user level; and
determining the startup acceleration corresponding to the user level of the current user of the self-balancing vehicle based on the stored correspondence.

7. The method according to claim 1, further comprising:
determining whether the user level of the current user of the self-balancing vehicle has changed; and
if the user level has changed, adjusting current startup acceleration of the self-balancing vehicle to be the startup acceleration corresponding to the changed user level.

8. The method according to claim 7, further comprising:
comparing the changed user level with the user level before the change;
in the case where the user level is demoted, locking the startup acceleration of the self-balancing vehicle corresponding to the user level before the change; and
in the case where the user level is promoted, unlocking the startup acceleration of the self-balancing vehicle corresponding to the user level before the change and changing the startup acceleration of the self-balancing vehicle corresponding to the user level before the change to the startup acceleration corresponding to the changed user level.

9. A device for safety driving, comprising:
a processor; and
a memory for storing instructions executable by the processor;
wherein the processor is configured to perform:
acquiring riding data of a current user of a self-balancing vehicle;
comparing the acquired riding data with riding data corresponding to a plurality of preset user levels;
determining a user level of the current user of the self-balancing vehicle according to a result of the comparing; and
after determining the user level of the current user of the self-balancing vehicle, determining a startup acceleration of the self-balancing vehicle according to the user level of the current user of the self-balancing vehicle, and
the riding data comprises one or more of the following data:

a riding time, a riding distance, a shaking frequency, a shaking arc magnitude, and a shaking time.

10. The device according to claim 9, wherein the riding data comprises the riding time or the riding distance, and the processor is further configured to perform:
   acquiring a plurality of riding time ranges or a plurality of riding distance ranges corresponding to the plurality of preset user levels, respectively; and
   determining a riding time range or a riding distance range to which the riding time or the riding distance of the current user of the self-balancing vehicle belongs, and
   determining the user level of the current user of the self-balancing vehicle according to the riding time range or the riding distance range to which the riding time or the riding distance of the current user of the self-balancing vehicle belongs.

11. The device according to claim 9, wherein the riding data comprises the shaking frequency, the shaking arc magnitude, and the shaking time, and
   the processor is further configured to perform:
   acquiring a plurality of shaking frequency ranges, a plurality of shaking arc magnitude ranges, and a plurality of shaking time ranges corresponding to the plurality of preset user levels, respectively; and
   determining a shaking frequency range, a shaking arc magnitude range, and a shaking time range to which the shaking frequency, the shaking arc magnitude and the shaking time of the current user of the self-balancing vehicle belongs, respectively, and
   determining the user level of the current user of the self-balancing vehicle according to the shaking frequency range, the shaking arc magnitude range, and the shaking time range to which the shaking frequency, the shaking arc magnitude, and the shaking time of the current user of the self-balancing vehicle belongs, respectively.

12. The device according to claim 11, wherein when the riding data comprises at least the shaking frequency, the shaking arc magnitude and the shaking time, the processor is further configured to perform:
   determining the user level of the current user of the self-balancing vehicle to be the user level determined according to the shaking frequency, the shaking arc magnitude and the shaking time of the current user of the self-balancing vehicle.

13. The device according to claim 10, wherein the processor is further configured to perform:
   displaying the user level of the current user of the self-balancing vehicle.

14. The device according to claim 10, wherein the processor is further configured to perform:
   presetting the startup acceleration of the self-balancing vehicle for each user level and storing a correspondence between each user level and the startup acceleration corresponding to the user level; and
   determining the startup acceleration corresponding to the user level of the current user of the self-balancing vehicle based on the stored correspondence.

15. The device according to claim 10, wherein the processor is further configured to perform:
   determining whether the user level of the current user of the self-balancing vehicle has changed; and
   in the case where the user level has changed, adjusting current startup acceleration of the self-balancing vehicle to be the startup acceleration corresponding to the changed user level.

16. The device according to claim 15, wherein the processor is further configured to perform:
   comparing the changed user level with the user level before the change;
   if the user level is demoted, locking the startup acceleration of the self-balancing vehicle corresponding to the user level before the change; and
   in the case where the user level is promoted, unlocking the startup acceleration of the self-balancing vehicle corresponding to the user level before the change and changing the startup acceleration of the self-balancing vehicle corresponding to the user level before the change to the startup acceleration corresponding to the changed user level.

17. A non-transitory computer-readable storage medium storing instructions that, when executed by a processor, cause the processor for performing a method for safety driving, the method comprising:
   acquiring riding data of a current user of a self-balancing vehicle;
   comparing the acquired riding data with riding data corresponding to a plurality of preset user levels;
   determining a user level of the current user of the self-balancing vehicle according to a result of the comparing; and
   after determining the user level of the current user of the self-balancing vehicle, determining a startup acceleration of the self-balancing vehicle according to the user level of the current user of the self-balancing vehicle.

* * * * *